(12) United States Patent
McGillis et al.

(10) Patent No.: US 7,032,228 B1
(45) Date of Patent: Apr. 18, 2006

(54) COMMON DEVICE INTERFACE

(75) Inventors: James M. McGillis, Franklin, MA (US); Robert DeCrescenzo, Franklin, MA (US); Timothy R. Rosner, Mansfield, MA (US); John Carrel, West Roxbury, MA (US); David Meiri, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 328 days.

(21) Appl. No.: 09/797,347

(22) Filed: Mar. 1, 2001

(51) Int. Cl.
*G06F 9/44* (2006.01)

(52) U.S. Cl. .................. 719/321; 719/320; 709/217
(58) Field of Classification Search ........... 719/311, 719/318, 320, 321; 710/65; 709/216–218; 711/100
See application file for complete search history.

(56) References Cited

U.S. PATENT DOCUMENTS

| | | | |
|---|---|---|---|
| 5,131,081 A * | 7/1992 | MacKenna et al. | 710/22 |
| 5,548,783 A * | 8/1996 | Jones et al. | 710/16 |
| 5,819,112 A * | 10/1998 | Kusters | 710/36 |
| 6,085,278 A * | 7/2000 | Gates et al. | 710/263 |
| 6,098,128 A * | 8/2000 | Velez-McCaskey et al. | 710/65 |
| 6,640,278 B1 * | 10/2003 | Nolan et al. | 711/6 |

\* cited by examiner

*Primary Examiner*—William Thomson
*Assistant Examiner*—Van Nguyen
(74) *Attorney, Agent, or Firm*—Daly, Crowley, Mofford & Durkee, LLP

(57) ABSTRACT

A common device interface for facilitating communication exchanges between physical transport drivers and higher-level software emulations. The common device interface is defined by an input/output control block (IOCB) data structure that allows those portions of different emulations and physical transport drivers that interact with each other to be generic. Thus, the emulation need not know or be concerned with the underlying characteristics of the type of physical transport driver with which it is communicating.

13 Claims, 16 Drawing Sheets

| FLAG | ACCEPTED VALUES/MEANINGS |
|---|---|
| IOBIF_EX_ORIG | 1 = EXCHANGE ORIGINATOR<br>0 = EXCHANGE RESPONDER |
| IOBIF_OUTB_PRI_0 | 00 = LOWEST PRIORITY NORMAL |
| IOBIF_OUTB_PRI_1 | 01 = MID - LOW PRIORITY<br>10 = MID - HI PRIORITY<br>11 = HIGHEST PRIORITY |
| IOBIF_ERR_ON_SHORT | 1 = RETURN ERROR IN RESOURCE SHORTAGE (I.E., DO NOT QUEUE)<br>0 = CDI QUEURIES AS NEEDED. |
| IOBIF_REQ_TO_DISC | 1 = DISCONNECT AFTER EXECUTING IOCTL OPERATION<br>0 = NOT REQUIRED TO DISCONNECT AFTER EXECUTING IOCTL OPERATION. |
| IOBIF_ULP_CMD_DONE | 1 = UPON EXECUTION OF IOCTL OPERATION, CDI DRIVER SHOULD CONSIDER THIS ULP COMMAND AND ASSOSIATED IOCB TO BE COMPLETE AND CAN FREE ALL ASSOCIATED RESOURCES. |
| IOBIF_GLBL_MEM_READ_DIR | 1 = IOCB READS FROM GLOBAL MEMORY |
| IOBIF_GLBL_MEM_WRITE_DIR | 1 = IOCB WRITES TO GLOBAL MEMORY |

FIG. 7

| FLAG | ACCEPTED VALUES/MEANINGS |
|---|---|
| IOBIF_CONNECTED | 1 = THE ULP OPERATION REFERENCED BY THIS IOCB IS CURRENTLY CONNECTED. |
| IOBIF_ABORTED | 1 = THE ULP OPERATION REFERENCED BY THIS IOCB IS ABORTED. |
| IOBIF_DISC_PRIV | 1 = THE ULP OPERATION REFERENCED BY THIS IOCB HAS DISCONNECT PRIVILEGES. |
| IOBIF_ULP_CMD_DONE | 1 = THIS INDICATES THAT THE CDI DRIVER CONSIDERS THE ULP COMMAND AND ASSOCIATED IOCB TO BE COMPLETE AND HAS FREED ALL ASSOCIATED RESOURCES. |

FIG. 8

| HEX CODE | OPCODE | DESCRIPTION |
|---|---|---|
| 0x01 | IOBC_CMD_NO_DATA | NO DATA COMMAND |
| 0x02 | IOBC_CMD_DATA_IN | DATA IN COMMAND |
| 0x03 | IOBC_CMD_DATA_OUT | DATA OUT COMMAND |
| 0x04 | IOBC_SEND_RSP | RETURNING STATUS |
| 0x05 | IOBC_SEND_DATA_IN | RETURNING REQUESTED DATA |
| 0x06 | IOBC_ACCEPT_DATA_OUT | SEND XFR_RDY. RECEIVE DATA |
| 0x07 | IOBC_NOP | NO OPERATION |
| 0x08 | IOBC_GET_LINKED_CMD | FETCH LINK COMMAND |
| 0x09 | IOBC_UNIT_LINK | INITIALIZE THE LINK |
| 0x10 | IOBC_SERVICE | REQUEST SPECIFIC SERVICES |
| 0x11 | IOBC_TAKE_LINK_OFFLINE | TAKE LINK OFFLINE |

FIG. 9

| | | 31 | | | 0 |
|---|---|---|---|---|---|
| ENTRY 0 | WORD 0 | RESERVED FOR CDI DRIVER (r) | | | |
| | WORD 1 | NEXT POINTER (r) | | | |
| | WORD 2 | INPUT FLAGS (i) | | OUTPUT FLAGS (o) | FORMAT (i) |
| | WORD 3 | DEVICE NUMBER (i) | | CMP Q INDEX (i) | CDI STAT (o) |
| | WORD 4 | OPCODE (i) | PORT (i) | PADDING | |
| | WORD 5 | DESTINATION ID (i/o) | | | |
| | WORD 6 | TRANSACTION ID (i) | | | |
| ENTRY 1 | WORD 7 | TIME STAMP (i) | | | |
| | WORD 8 | RESPONSE POINTER (i) | | | |
| | WORD 9 | RSP COUNT (i) | | BYTES TRANSFERRED (o) | |

FIG. 12

| FLAG | ACCEPTED VALUES/MEANINGS |
|---|---|
| SGL_LAST_ENTRY | 1 = LAST ENTRY IN LIST<br>0 = NOT LAST |
| SGL_MEM_TO_PIPE | 1 = MEMORY READ<br>0 = MEMORY WRITE |
| SGL_GLB_MEM_TYPE | 1 = GLOBAL MEMORY<br>0 = CONTROL STORE |
| SGL_PADDING_ZEROES | 1 = PADDING ZEROES<br>0 = NORMAL |
| SGL_XOR_TYPE_MOVE | 1 = USE HW XOR☐<br>0 = NO XOR |
| SGL_EMUL_NE_PHYS | 1 = BREAK DMAS AT EMULATION SECTOR BOUNDARIES<br>0 = NO NEED TO BREAK AT EMULATION SECTOR BOUNDARIES<br>*(THIS FLAG IS SA-SPECIFIC. IT IS USED IN CONJUNCTION WITH FORMAT SEC_CRC TO INDENTIFY IOCBS/SGLS DIRECTED TO DEVICES WHOSE EMULATION SECTOR SIZE IS NOT EQUAL TO THEIR PHYSICAL SECTOR SIZE.)* |
| SGL_CONTINUOUS_DMA | 1 = ANOTHER SGL ENTRY FOLLOWS THIS ONE: KEEP THE DMA PIPE OPEN BECAUSE THE DESTINATION ADDRESSES ARE CONTIGUOUS<br>0 = NO NEED TO KEEP THE DMA PIPE OPEN<br>*(THIS FLAG IS SA-SPECIFIC.)* |
| SGL_CRC_BEFORE | 1 = ON COMPLETION OF THIS MEM_TO_PIPE TRANSFER, THE SEGMENT CRC SHOULD BE READ FROM HARDWARE BEFORE THE PIPE GATE ARRAY IS DISABLED<br>0 = NO NEED TO READ THE SEGMENT CRC FROM HARDWARE BEFORE DISABLING THE PIPE GATE ARRAY<br>*(THIS FLAG IS SA-SPECIFIC.)* |

FIG. 14

COMMON DEVICE INTERFACE

BACKGROUND OF THE INVENTION

The invention relates generally to data processing system software and, more particularly, to device driver software.

Conventional data storage systems are configured with intelligent firmware to control attached system resources such as physical transport devices, e.g., network or storage buses. Typically, the system software must support different code for each of the devices and their drivers. When a new device and associated driver are added to the system, portions of the system software code must be modified, and the revised code tested and maintained, at significant cost and inconvenience to the system manufacturer.

SUMMARY OF THE INVENTION

In one aspect of the invention, facilitating data storage system communication exchanges includes providing a control block data structure that is common to different types of physical transport drivers and a higher-level software and using the control block data structure to pass information between the higher-level software and one of the different types of physical transport drivers.

In another aspect of the invention, a common device interface includes a control block data structure stored in a memory, the control block data structure being used by different physical transport drivers and different higher-level software emulations in exchanges therebetween. The emulations each correspond to a combination of software for a different I/O control interface and software implementing an upper level protocol. The control block data structure is defined to isolate unique characteristics of different physical transports supported by the different physical transport drivers from the different higher-level software emulations.

One or more aspects of the invention may include one or more of the following advantages. The control block data structure provides for a common device interface (CDI) between emulations and physical transport drivers. The structure requires that the CDI-compliant emulations and physical transport drivers have knowledge of data transfer direction and data count, but not the underlying meaning or characteristics of the command or response passed down to them from upper level protocol layers. Therefore, the CDI enables the same physical layer driver to be used across multiple emulations and each emulation to be written independently of the underlying physical transport layer. For example, a given emulation can be written using the CDI and then used with a Fibre Channel or a Parallel SCSI driver. Because the physical transport is isolated within the CDI driver, the emulation need not contain undesirable conditional code based on the physical transport layer. Also, porting the emulation to a future physical layer is made easier since all that is needed to support the new physical layer is a new CDI driver. In addition, in a system of interconnected system nodes (e.g., data storage systems), the flexible, generic format of the CDI supports peer-to-peer communications by allowing a system node to act as both a communications originator and responder.

Other features and advantages of the invention will be apparent from the following detailed description and from the claims.

BRIEF DESCRIPTION OF THE DRAWINGS

FIG. 7 is a table of definitions for an IOCB input flags field of the IOCB of FIG. 6.

FIG. 8 is a table of definitions for an IOCB output flags field of the IOCB of FIG. 6.

FIG. 9 is table of opcode values and descriptions corresponding to an opcode field of the IOCB of FIG. 6.

FIG. 12 is a depiction of a format of an opcode-specific area of the IOCB of FIG. 6 when the opcode field defines a 'returning status' opcode.

FIG. 14 is a table of available flags that may be defined in an SGL flags field in an SGL entry.

DETAILED DESCRIPTION

Figure 1:
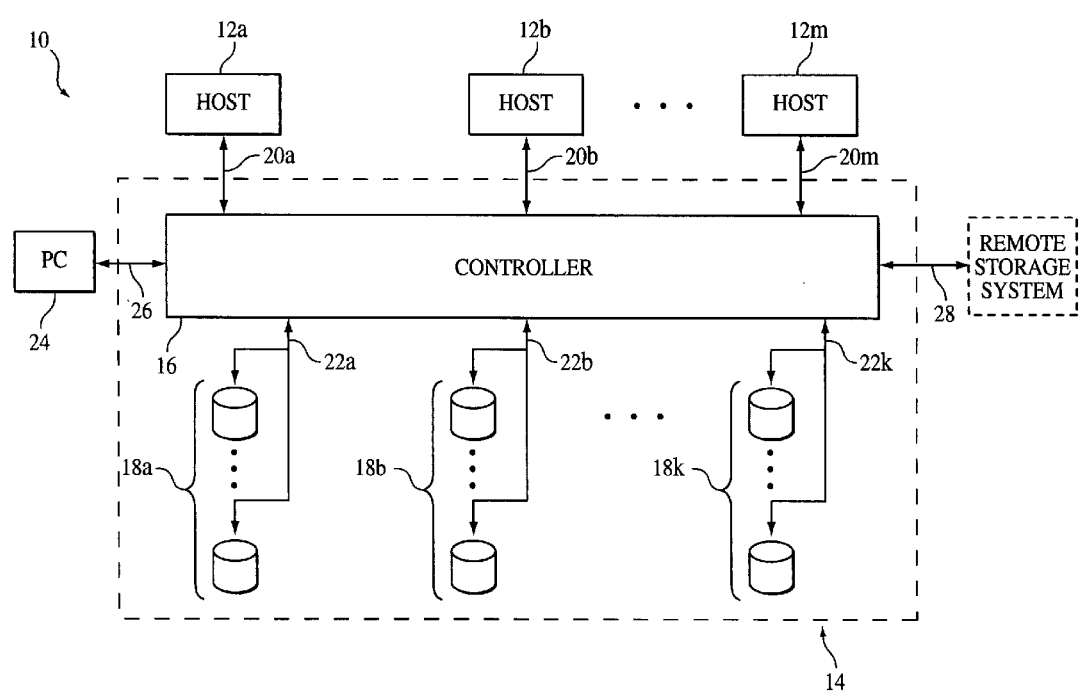
FIG. 1 is block diagram of a data processing system including host computers coupled to a data storage system, which includes storage devices coupled to a storage controller for controlling data transfers between the host computers and storage devices as well as between the data storage system and another data storage system.

Referring to FIG. 1, a data processing system 10 includes host computers 12*a*, 12*b*, . . . , 12*m*, connected to a data storage system 14. The data storage system 14 receives data and commands from, and delivers data and responses to, the host computers 12. The data storage system 14 is a mass storage system having a controller 16 coupled to pluralities of physical storage devices shown as disk devices 18*a*, disk devices 18*b*, . . . , disk devices 18*k*. Each of the disk devices 18 is logically divided, in accordance with known techniques, into one or more logical volumes.

The controller 16 interconnects the host computers 12 and the disk devices 18, and can be, for example, that made by EMC and known as the Symmetrix controller. The controller 16 thus receives memory write commands form the various host computers over buses 20*a*, 20*b*, . . . , 20*m*, respectively, for example, connected and operated in accordance with a SCSI protocol, and delivers the data associated with those commands to the appropriate devices 18a, 18b, . . . , 18k, over respective connecting buses 22a, 22b, . . . , 22k. Buses 22 also operate in accordance with a SCSI protocol. Other protocols, for example, Fibre Channel, could also be used for buses 20, 22. The controller 16 also receives read requests from the host computers 12 over buses 20, and delivers requested data to the host computers 12, either from a cache memory of the controller 16 or, if the data is not available in cache memory, from the disk devices 18.

In a typical configuration, the controller 16 also connects to a console PC 24 through a connecting bus 26. The console PC 24 is used for maintenance and access to the controller 16 and can be employed to set parameters of the controller 16 as is well known in the art.

Optionally, the controller may be connected to a remote data processing system like the data processing system 10 or a remote data storage system like the data storage system 14 (shown in dashed lines) for data back-up capability by a data link 28. The data link may be implemented as an ESCON fiber-optic link, or may be connected and operated in accordance with Fibre Channel or Gigabit Ethernet protocols. Other types of remote connections can also be used. The data link 28 enables a remote data storage system to store on its own devices a copy of information stored in the devices 18 of the data storage system 14 in a mirrored manner.

Figure 2:
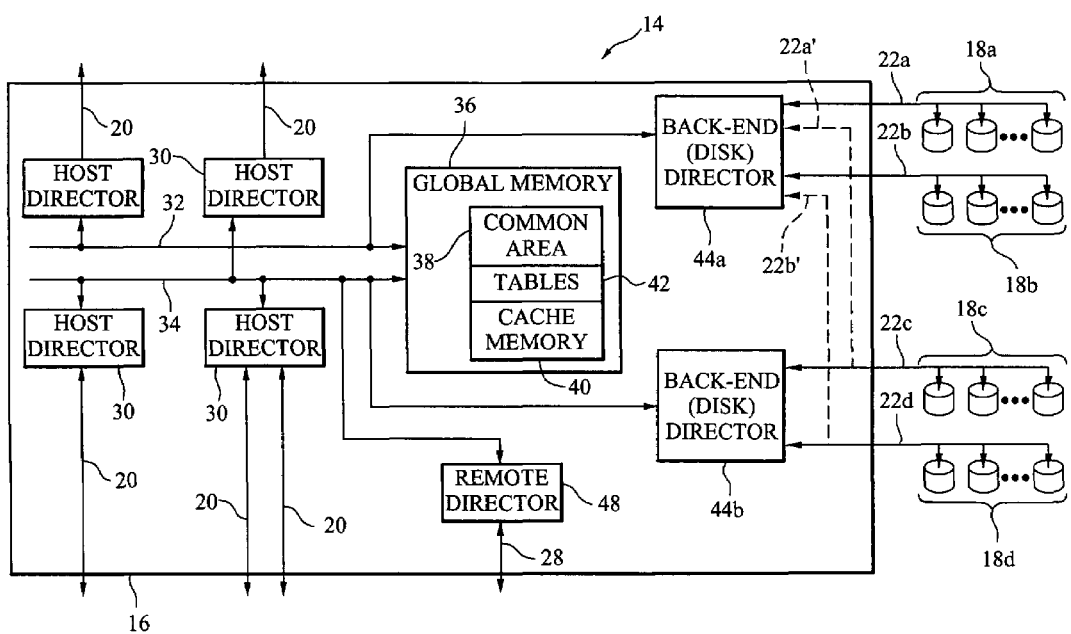
FIG. 2 is a detailed block diagram of the data storage system and its storage controller shown in FIG. 1.

In operation, the host computers 12a, 12b, . . . , 12m, send, as required by the applications they are running, commands to the data storage system 14 requesting data stored in the logical volumes or providing data to be written to the logical volumes. Referring to FIG. 2, and using the EMC Symmetrix controller as an illustrative example, details of the internal architecture of the data storage system 14 are shown. The communications from the host computer 12 typically connect the host computer 12 to a port of one or more host directors 30 over the SCSI bus lines 20. Each host director, in turn, connects over one or more system buses 32 or 34 to a global memory 36. The global memory 36 is preferably a large memory through which the host director 30 can communicate with the disk devices 18. The global memory includes a common area 38 for supporting communications between the host computers 12 and the disk devices 18, a cache memory 40 for storing data and control data structures, and tables 42 for mapping areas of the disk devices 18 to areas in the cache memory 40.

Also connected to the global memory 36 are back-end (or disk) directors 44, which control the disk devices 18. In the preferred embodiment, the disk directors are installed in the controller 16 in pairs. For simplification, only two disk directors, indicated as disk directors 44a and 44b, are shown. However, it will be understood that additional disk directors may be employed by the system.

Each of the disk directors 44a, 44b supports four bus ports. The disk director 44a connects to two primary buses 22a and 22b, as well as two secondary buses 22a' and 22b'. The buses are implemented as 16-bit wide SCSI buses. As indicated earlier, other bus protocols besides the SCSI protocol may be used. The two secondary buses 22a' and 22b' are added for redundancy. Connected to the primary buses 22a, 22b, are the plurality of disk devices (e.g., disk drive units) 18a and 18b, respectively. The disk director 44b connects to two primary buses 22c and 22d. Connected to the primary buses 22c, 22d are the plurality of disk devices or disk drive units 18c and 18d. Also connected to the primary buses 22c and 22d are the secondary buses 22a' and 22b'. When the primary bus is active, its corresponding secondary bus in inactive, and vice versa. The secondary buses of the disk director 44b have been omitted from the figure for purposes of clarity.

Like the host directors 20, the disk directors 44 are also connected to the global memory 36 via one of the system buses 32, 34. During a write operation, the disk directors 44 read data stored in the global memory 36 by a host director 30 and write that data to the logical volumes for which they are responsible. During a read operation and in response to a read command, the disk directors 44 read data from a logical volume and write that data to global memory for later delivery by the host director to the requesting host computer 12.

As earlier mentioned, the data storage system 14 may be remotely coupled to another data storage system 14 in a mirrored storage configuration via the data link 28. Still referring to FIG. 2, each data storage system 14 in the mirrored storage configuration includes a remote director 48 to connect to the data link 28 and handle transfers of data over that link. The remote director 48 communicates with the global memory 36 over one of the system buses 32, 34.

Figure 3:
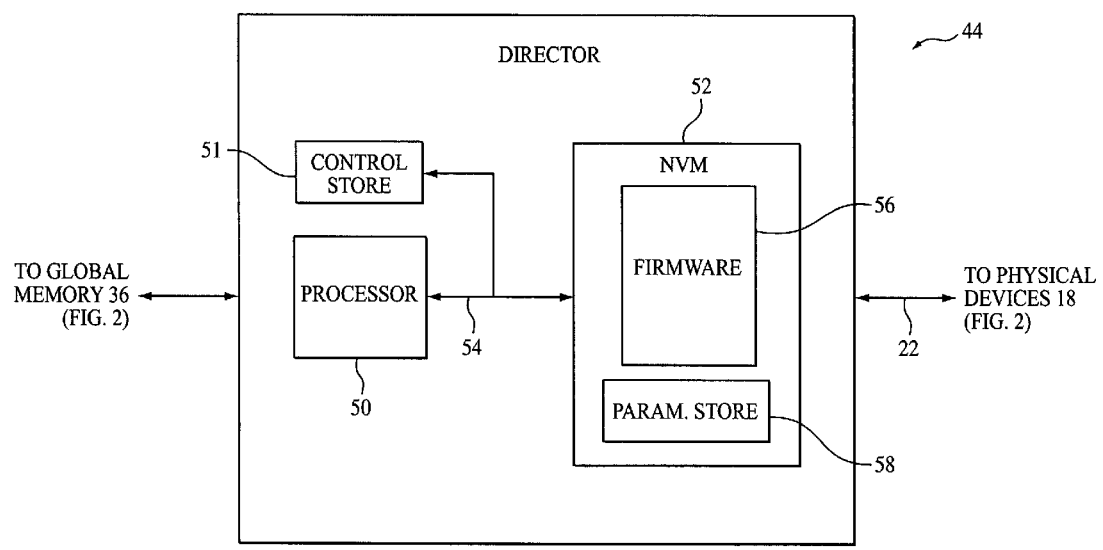
FIG. 3 is a block diagram of a "director" employed by and being configurable to control front-end, back-end or remote activities of the storage controller (shown in FIG. 2).

As shown in FIG. 3, each of the directors 30, 44, 48 (represented in the figure by the director 44) includes a processor 50 coupled to a control store 51 and a local, nonvolatile memory (NVM) 52 by an internal bus 54. The processor 50 controls the overall operations of the director 44 and communications with the memories 51 and 52. The local memory 52 stores firmware (or microcode) 56 and parameter data in a parameter store 58, both of which are read each time the data storage system 14 is initialized. The microcode 56 is copied into the control store 51 at initialization for subsequent execution by the processor 50.

Figure 4:
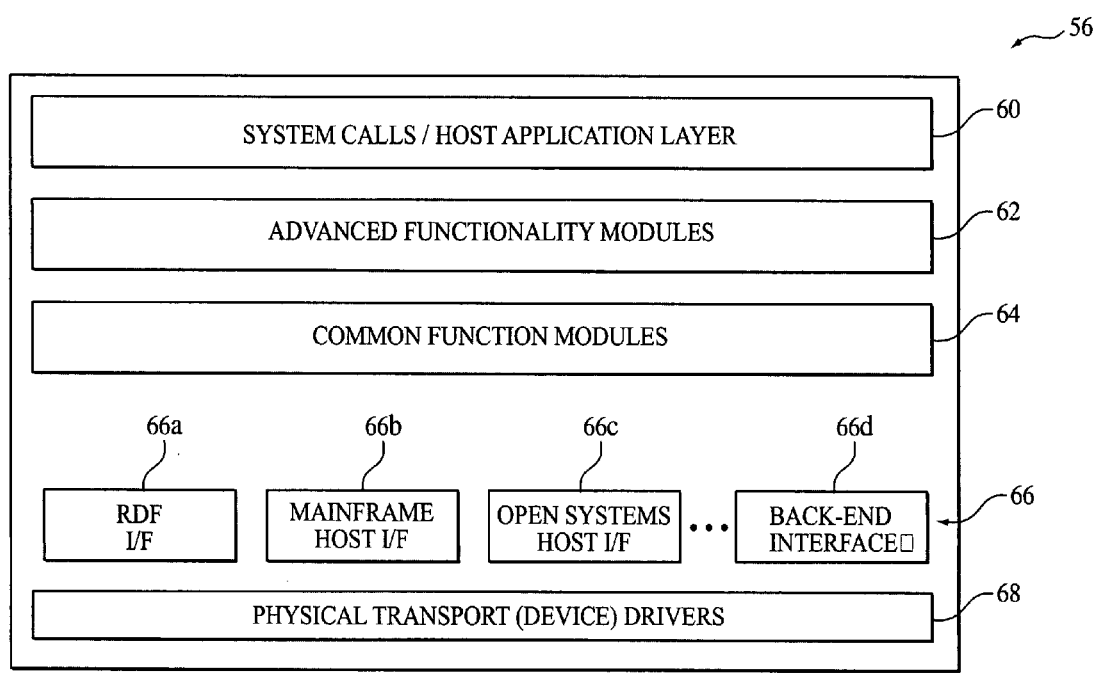
FIG. 4 is a block diagram of the director firmware and its components.

Referring to FIG. 4, the components of the director microcode 56 can include the following: a system calls/host application layer 60; advanced functionality modules 62, which may be optional at the director level or even at the data storage subsystem level; common function modules 64, which are provided to each director; one of interface (or I/O control interface) modules 66; and one or more physical transport (or device) drivers 68. Interface modules exist for each of the different types of directors that are available based on connectivity and/or function. As shown, the modules 66 can include a number of different interfaces, such as a Remote Data Facility (RDF) interface 66a to define the functionality of the remote director 48, mainframe and Open Systems host interfaces 66b and 66c, respectively, to define host directors 30, and a back-end interface 66h to define the functionality of the back-end director 44. For example, a director that has been loaded with the disk director or interface code 66h is thus programmed to serve as the disk director 44 or one of disk directors 44 (when more than one is present in the system). As such, it is responsible for controlling back-end operations of the controller 16. These operations include services for read misses, write destaging, read prefetching, RAID, data copy, as well as other background drive operations.

Figure 5:
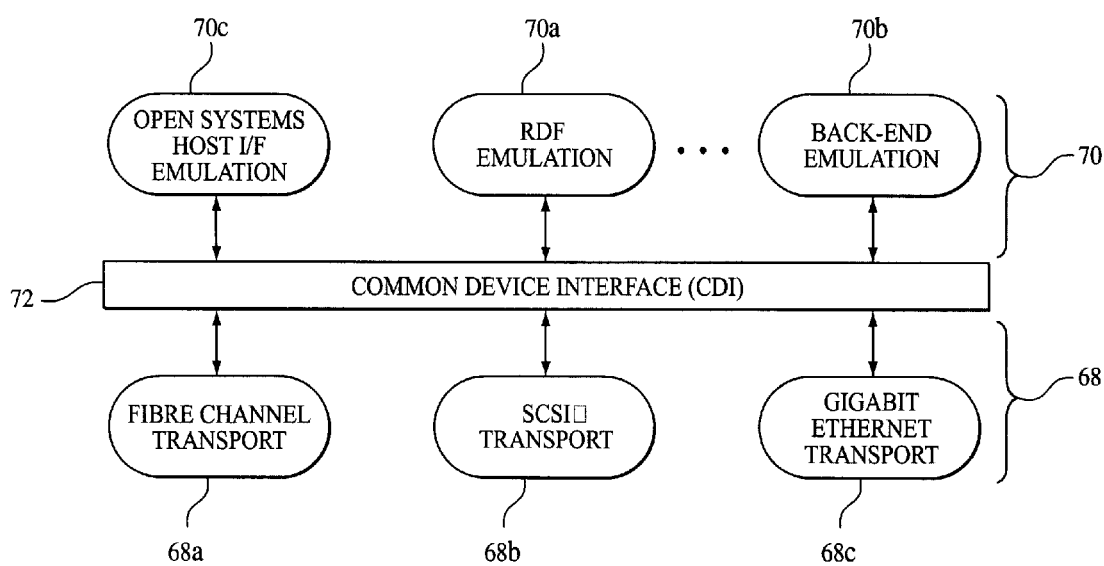
FIG. 5 is a logical depiction of a common device interface (CDI) architecture based on a common device interface for supporting various emulations and various physical transport drivers.

FIG. 5 presents a logical depiction of emulations 70, various supported ones of the drivers 68 and a common device interface (or "CDI") 72 through which the emulations 70 and drivers 68 communicate, as will be described in further detail below. An emulation is defined as software that implements both an Upper Level Protocol (ULP), that is, a protocol associated with functionality in one or more of layers 60, 62 and 64 (from FIG. 4), and functions corresponding to one of the I/O control interfaces 66. Thus, the emulations 70 reside above the physical transport layer and include software corresponding to one of the I/O control interfaces 66 as well as software implementing a ULP. Among the emulations 70 shown are an RDF emulation 70a, an Open Systems host interface emulation 70c and a back-end emulation 66h. The physical transport drivers 68 can include, but need not be limited to, a Fibre Channel transport 68a, a SCSI transport 68b and a Gigabit Ethernet transport 68c.

The specification of CDI recognizes that different physical transports have different physical formats, data capacities and access characteristics. If specialized versions of each of the emulations had to be produced for each separate, different type of physical transport, the number of emulation versions would continue to increase over time thereby making the provision of updated products to system purchasers difficult and expensive. Consequently, the CDI accommodates and isolates those physical transport differences so that those portions of the drivers and emulations that interact with each other are generic in nature. The CDI provides for versatility and is intended to support any existing or envisioned transport functionality (or protocol). In addition to abstracting the details of different physical transport protocols, the CDI handles physical data movement (e.g., via a DMA mechanism, as described below) and makes that data movement transparent to higher-level software.

As indicated above, the CDI allows a wide range of emulations to share a common driver interface. The interface itself can be viewed as being embodied in an I/O control block (hereinafter, "IOCB") data structure. This IOCB data structure is a generic structure that serves to define a common interface between each emulation 70 and each of the drivers 68. To make a request (containing a ULP command) to a physical transport-level CDI driver, an emulation uses a call, 'CDI IOCTL' that takes as its only parameter a pointer to an IOCB describing the request. During the lifetime of that request and its associated IOCB, the control of the IOCB alternates between the emulation and the CDI driver that has accepted it. The CDI driver has control of the IOCB while an IOCTL call is outstanding. The emulation has control of the IOCB when the call request has been completed. Notification of events, e.g., the completion of an IOCTL call or the arrival of a new ULP command, is signaled by the CDI driver to the emulation by placing corresponding IOCBs on queues referred to herein as event (or completion) queues. Thus, the emulation detects a call request completion status when it determines that the IOCB associated with the call has been placed on an event queue by the CDI driver. By removing the IOCB from the event queue, the emulation gains control of the buffer that had been allocated to that IOCB.

The CDI may be supported in a polled or interrupt driven environment. In a polled environment, the emulation must make periodic calls to a routine that acts as an interrupt service routine in that is gives the driver a chance to look at the physical interface and process any accumulated events. This call must be made frequently to facilitate the timely discovery of new events or the completion of requests. In an interrupt driven environment, interrupts allows events to be processed as they occur.

Figure 6:
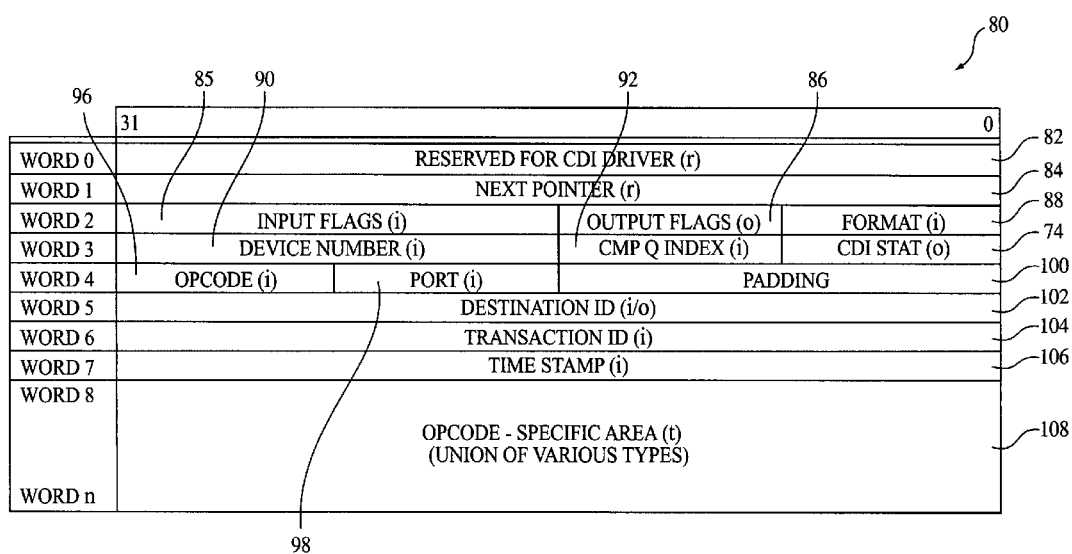
FIG. 6 is a depiction of an exemplary format of a CDI I/O Control Block (IOCB).

FIGS. 6 though 14 are illustrations of one embodiment of the CDI IOCB. In some of these figures, the notations '(i)', '(o)', '(i/o)' and '(r)' are used to indicate that a particular field is an input, output, input/output or reserved field. An input field is set up by the CDI emulation. An output field is written by the CDI driver. An input/output field is set up by the CDI emulation and written by the CDI driver. A reserved field is reserved for the CDI driver.

As shown in FIG. 6, the IOCB structure 80 is as follows. It includes a first word 82 that is reserved for a CDI driver followed by six words (1–7) that are fixed for all emulations and request types. Words 1 through 7 include the following: a Next Pointer 84; Input Flags 85; Output Flags 86; Format 88; Device Number 90; a Completion Queue (Cmp Q) Index 92; a CDI Status (Stat) field 94; an Opcode 96; a Port 98; a Padding field 100; a Destination ID 102; a Transaction ID 104; and a Timestamp 106. Words 8 though n provide an area for specifying Opcode-specific information 108. The Next Pointer field 84 specifies a pointer value and is used by the CDI driver to link together IOCBs in the event (completion) queues. The Input Flags 85 includes flags that are set by the emulation to further qualify the operation code by providing details about how the CDI driver should carry out the operation specified by the opcode.

Definitions for exemplary IOCB input flags that may be specified in the Input Flags field 85 are shown in FIG. 7. Each of the input flags have the prefix "IOBIF_". The types of flags include: EX_ORIG 110; OUTB_PRI_0 112; OUTB_PRI_1 114; ERR_ON_SHORT 116; REQ_TO_DISC 118; ULP_CMD_DONE 120; GLBL_MEM_READ_DIR 122; and GLBL_MEM_WRITE_DIR 124.

Referring back to FIG. 6, the Output Flags 86 are set by the CDI driver to relay additional information to the emulation as to the state of the ULP command. These flags can provide useful information for optimizing performance and aiding in error recovery scenarios.

Definitions for exemplary IOCB output flags that may be specified in the Output Flags field 86 are shown in FIG. 8. Each of the output flags has the prefix "IOBOF_". The types of flags include: Connected 130; Aborted 132; DISC_PRIV 134; and ULP_CMD_DONE 136.

Referring again to FIG. 6, the Format field 88 corresponds to a format number of the IOCB. The Device Number 90 corresponds to a logical device number. The Operation Code (opcode) 96 defines a function requested by the emulation to the CDI driver.

The types of opcodes, their values and descriptions are provided in FIG. 9. The opcode definitions have the prefix "IOBC_". The opcodes include the following: a 'no data' command (CMD_NO_DATA) opcode 140; a 'data in'command (CMD_DATA_IN) opcode 142; a 'data out' command (CMD_DATA_OUT) opcode 144; a 'returning status' (SEND_RSP) opcode 146; a 'returning requested data' (SEND_DATA_IN) opcode 148; a 'send XFR_RDY/ receive data' (ACCEPT_DATA_OUT) opcode 150; a 'no operation' (NOP) opcode 152, a 'fetch link command' (GET_LINKED_CMD) opcode 154; an 'initialize the link' (INIT_LINK) opcode 156; a 'request specific services' (SERVICE) opcode 158; and a 'take link offline' (TAKE_LINK_OFFLINE) opcode 160.

Returning to FIG. 6, the completion queue index 92 specifies an index of an event queue through which the completion of an IOCB operation is signaled. The index allows the emulation to direct the completion notification to a specific event queue. The CDI Status field 94 indicates the completion status of an IOCB. The emulation examines this field when an IOCB is de-queued from an event queue. The Destination ID 102 describes the address of an entity with which the emulation wants to communicate. The Transaction ID 104 is defined by an emulation and remains unchanged throughout an IOCTL operation. The emulation uses the Transaction ID field 104 to logically link the IOCB to some higher-level emulation entity or for any other emulation-specific purpose. The Timestamp field 106 is used by the emulation to specify a timestamp indicating the start of the I/O defined by the IOCB. The emulation uses the Timestamp 106 for debugging and timing analysis.

As earlier indicated, words 8 through n of the IOCB structure (the opcode specific area 108) provide further detail about the opcode specified in the opcode field 96. That is, the area 108 is defined according to the opcode specified in the opcode field 96.

Figure 10:
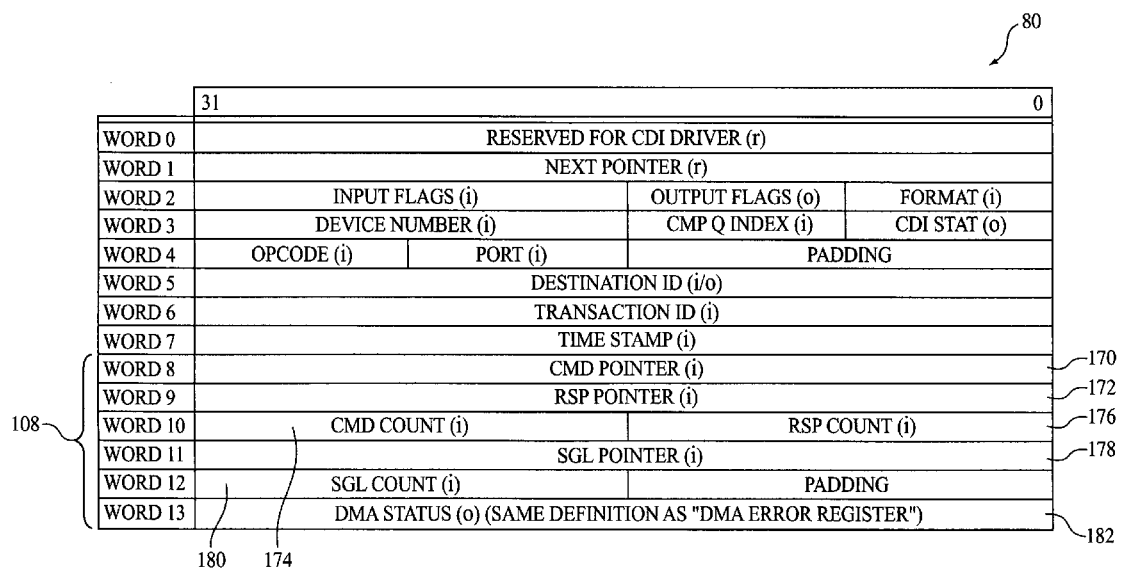
FIG. 10 is a depiction of a format of an opcode-specific area of the IOCB of FIG. 6 when the opcode field defines a 'no data', 'data in' or 'data out' command type opcode.

Referring to FIG. 10, the definition of the IOCB for the opcode-specified area 108 for opcodes IOBC_CMD_NO_DATA, IOBC_CMD_DATA_IN and IOBC_CMD_DATA_OUT are shown. The area 108 includes the following: a Command (Cmd) Pointer 170, which points to the ULP command payload; a Response (RSP) Pointer 172 to point to the buffer where the ULP response payload is to be written; a Cmd Count 174 that specifies the length of the ULP command payload to be sent to the destination; and RSP Count 176 that specifies the length of the buffer for the ULP response data; a Scatter-Gather List (SGL) Pointer 178 to point to a scatter-gather linked list; an SGL Count 180 indicating the number of SGL structures in the scatter-gather linked list; and a DMA Status field 182 that indicates a value corresponding to the logical Oring of all of the DMA status words from each entry of the scatter-gather list. This field can be checked for nonzero to determine if there was an error. If an error is detected, the individual SGL status words can be checked to determine the type of error that occurred.

Figure 11:
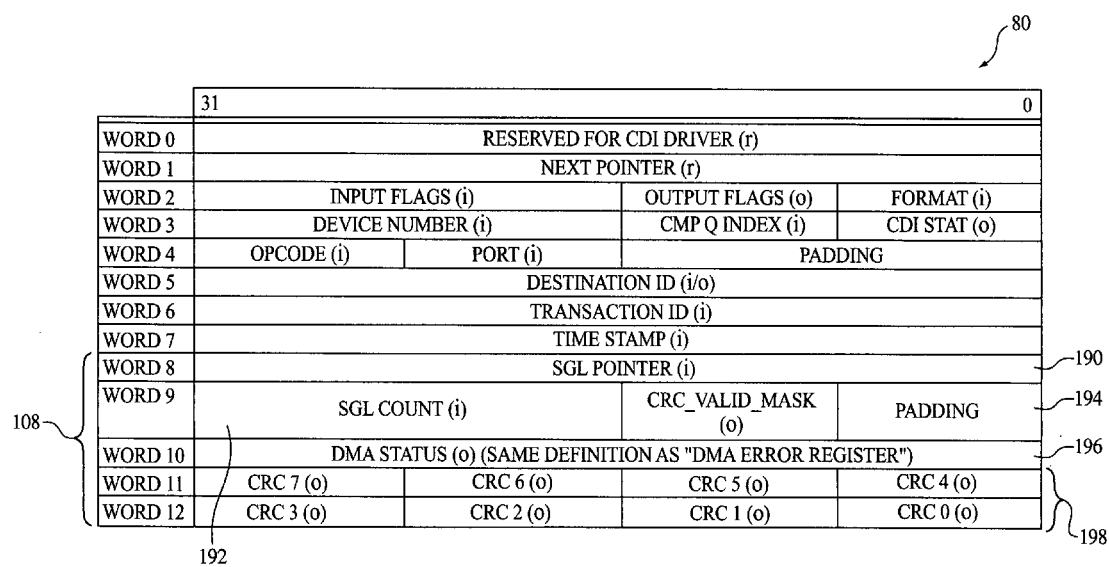
FIG. 11 is a depiction of a format of an opcode-specific area of the IOCB of FIG. 6 when the opcode field defines either a 'returning requested data' opcode or a 'send transfer ready (XFR_RDY)/receive data' opcode.

Referring to FIG. 11, the definition of the IOCB for the opcode-specified area 108 for opcodes IOBC_SEND_DATA_IN and IOBC_ACCEPT_DATA_OUT is shown. For these opcodes, the area 108 includes the following fields: an SGL Pointer 190; an SGL Count 192; a CRC_valid_mask 194, which is a mask of valid CRC array elements; DMA Status field 196; and CRC fields 198 (one for each of eight bytes, that is, CRC 0 through CRC 7) for identifying the CRCs generated on in-bound transfers of 4 KB boundaries.

Referring to FIG. 12, the definition of the IOCB for the opcode-specified area 108 for an IOBC_SEND_RSP opcode is shown. The area 108 includes the following fields: a Response Pointer 200; an RSP Count 202; and Bytes Transferred 204. The Response Pointer 200 specifies a pointer to the ULP response buffer to be sent to the originator. The RSP Count 202 indicates a length of the buffer for the ULP response data to be sent to the originator. The Bytes Transferred 204 specifies the total number of bytes actually transferred by the request.

Figure 13:
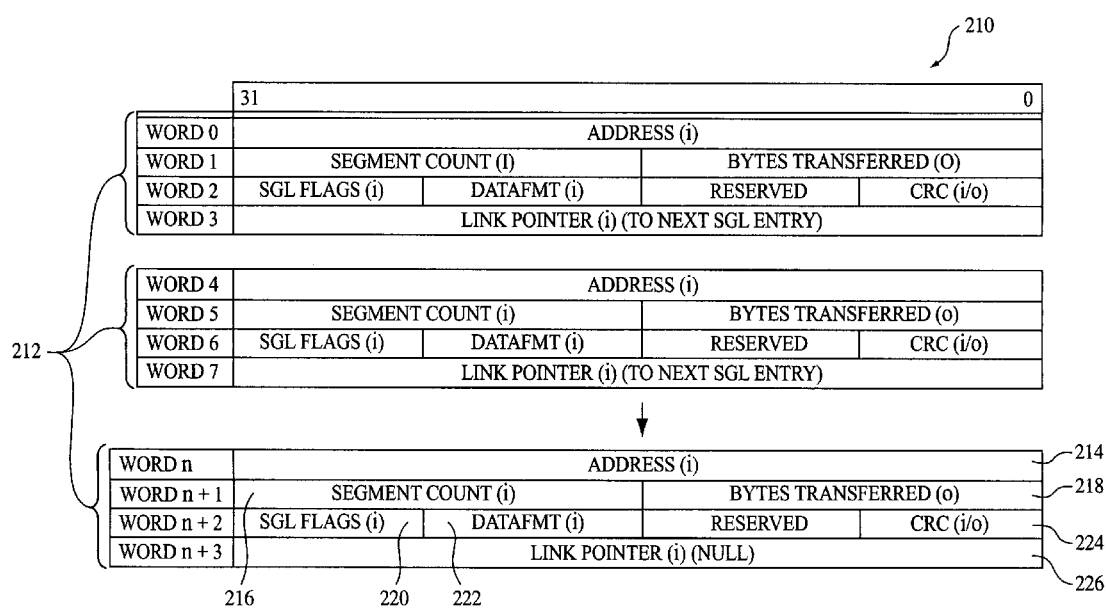
FIG. 13 is a depiction of a scatter-gather list (SGL) pointed to by a pointer in the IOCB and used for data transfers.

Referring to FIG. 13, a Scatter-Gather List (SGL) 210 referenced by the data transfer commands illustrated in FIGS. 10 and 11 is shown in detail. The SGL 210 includes one or more entries 212, and each entry 212 includes an Address field 214 that specifies an address in the global memory (global memory 36 in FIG. 2) or control store memory (control store 51 in FIG. 3). Further included in each entry 212 is a Segment Count 216 (in bytes), a Bytes Transferred field 218 for indicating the number of bytes actually transferred and an SGL Flags field 220 to specify a flag that provide information about the SGL segment corresponding to the address in the address field 214. FIG. 14 provides a description of the available flags, which allow each SGL entry 212 to have its own DMA characteristics. Also included in the entry 212 is an SGL Data Format (DataFmt) 222. This format describes the type of data protection that applies to the data in the SGL segment. For example, there may be no protection, a byte-CRC of the entire DMA, a sector CRC, or other types. A CRC field 224 provides a value that is used as the starting seed for the CRC for the DMA of the segment. After the DMA, the value is updated with the accumulated CRC from the DMA for the segment. A Link Pointer field 226 provides a pointer that points to the next entry 212 (or NULL, if the entry is the last entry) in the SGL 210.

It will be understood from the IOCB description above that CDI requires information about the direction of a data transfer (as indicated by the opcode) and associated data count, but is otherwise ignorant of the underlying meaning of the ULP defined command or response.

Figure 15A:
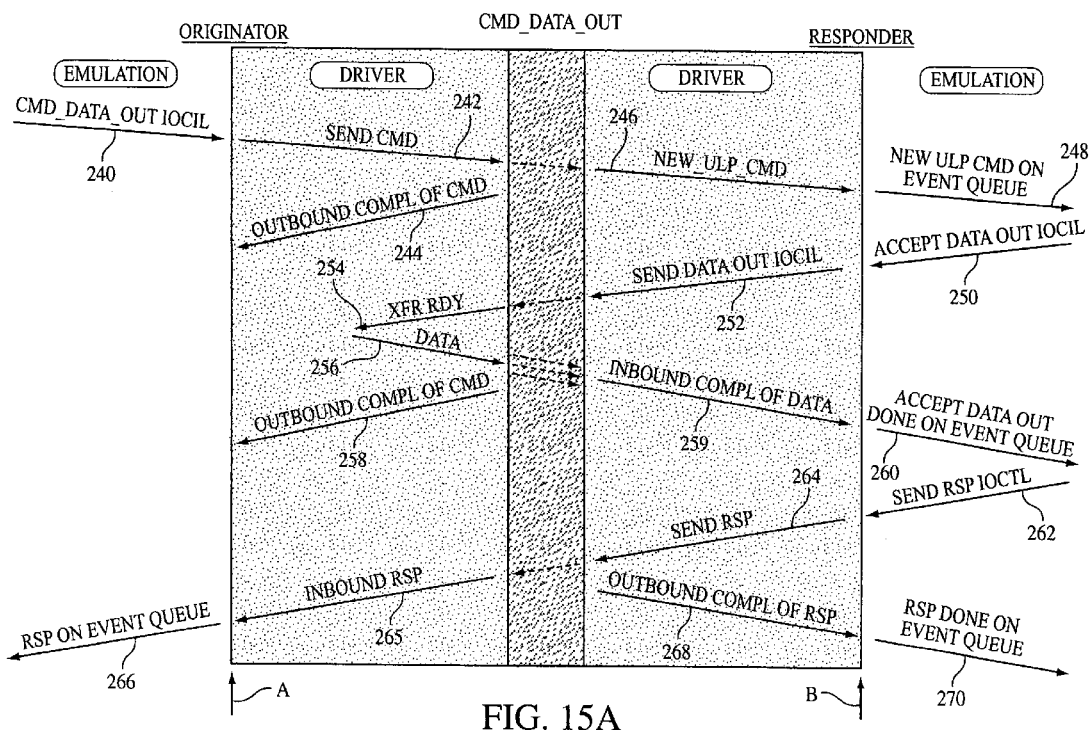
FIGS. 15A and 15B are illustrations of exchanges between emulations and physical transport drivers during a peer-to-peer communication between the data storage system and a remote data storage system for a write operation and a read operation, respectively.
Figure 15B:
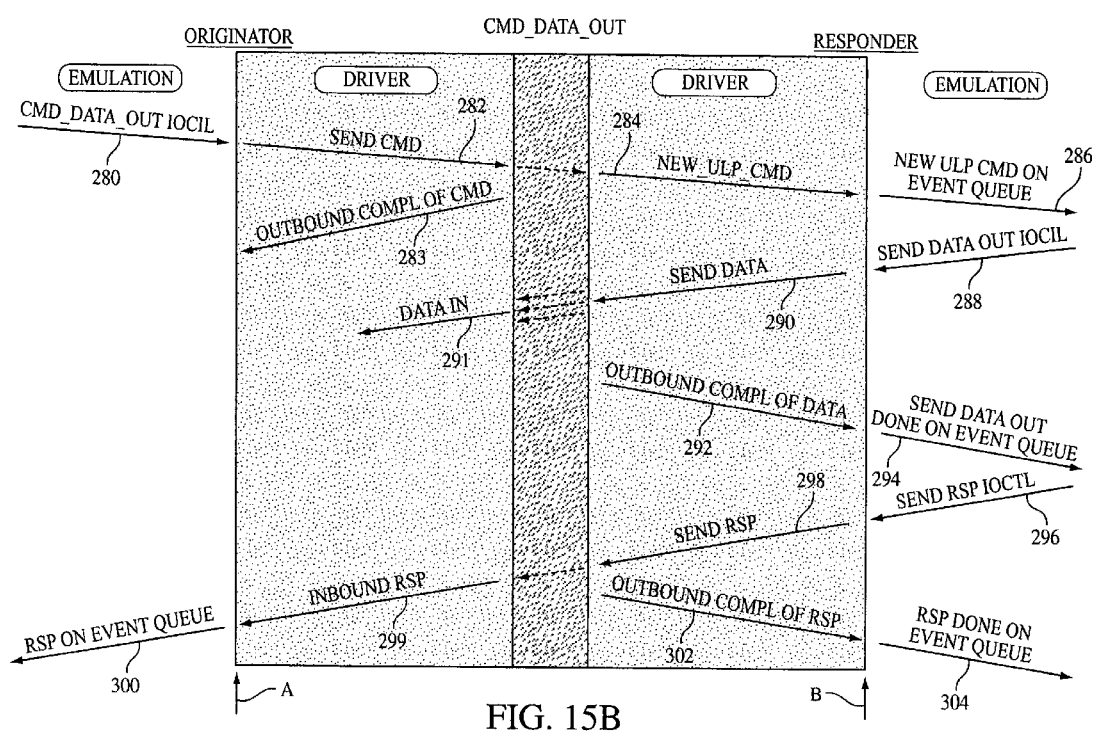

FIGS. 15A and 15B illustrate exemplary exchanges between emulations and CDI drivers in a peer-to-peer communication, for example, between the remote director 48 in the data storage system 14 (FIG. 2) acting as an originator and a remote director in a remote data storage system (connected to the data storage system 14 via the data link 28, as shown in FIG. 2) acting as a responder during a write operation (using CMD_DATA_OUT) and a read operation (using CMD_DATA_IN), respectively. These examples highlight an important aspect of CDI, that is, that CDI allows a system node to be both an originator and a responder simultaneously. It should be noted that the illustrations of FIGS. 15A and 15B depict both CDI formatted interactions (interactions or exchanges occurring across the emulation/responder interfaces indicated by the arrows labeled "A" and "B", as well as the driver-to-driver communications (occurring entirely in the shaded region), which are not based on CDI.

Referring to FIG. 15A, a write operation (CMD_DATA_OUT) begins with the originator emulation allocating and preparing an IOCB for a CMD_DATAOUT opcode, and then issuing a CMD_DATA_OUT IOCTL call to the originator CDI driver (step 240). The originator CDI driver causes the ULP command payload identified by the IOCB to be provided to the responder CDI driver (step 242) and detects the outbound completion of this task (step 244). The remote CDI driver provides the ULP command to the responder emulation in an IOCB (step 246) and places the new ULP command IOCB on a local event queue to signal its arrival (step 248) to the responder emulation. The responder emulation prepares an IOCB for an ACCEPT_DATA_OUT opcode and issues an ACCEPT_DATA_OUT (send transfer) IOCTL call for receiving data (step 250). The responder CDI driver provides the 'transfer ready' command from the ACCEPT_DATA_OUT IOCB to the originator CDI driver (step 252). In response to a 'transfer ready' detection (step 254), the originator CDI driver causes the DMA transfer of the data pointed to by the SGL in the original write call (IOCB_CMD_DATA_OUT) to the responder (step 256). The originator CDI driver detects outbound completion of the data transfer (step 258). The responder CDI driver detects the inbound transfer completion (step 259) and notifies the responder 1 emulation by placing the ACCEPT_DATA_OUT IOCB on a responder event queue (step 260). The responder emulation prepares a SEND_RSP IOCB and issues a SEND_RSP IOCTL call to return status to the originator emulation (step 262). The responder CDI driver causes the status response to be passed to the originator CDI driver (step 264), which detects and stores the inbound status (step 265), and then signals completion of the CMD_DATA_OUT (data write and status) via an originator event queue (step 266). The originator emulation detects that the completion has been indicated via an originator event queue, logically completes the I/O and frees the IOCB that had been allocated for the IOCB_CMD_DATA_OUT IOCTL call (not shown). The responder CDI driver detects that the outbound SEND_RSP command transfer was completed (step 268) and places the SEN- D_RSP IOCB on a responder event queue (step 270). The responder emulation detects the event queue notification and de-allocates the SEND_RSP IOCB (not shown).

Referring to FIG. 15B, a read begins with the originator emulation allocating and filling an IOCB for a CMD_DATA_IN opcode, and issuing a CMD_DATA_IN IOCTL call (step 280). The originator CDI driver causes the ULP command payload pointed to by the CMD_DATA_IN IOCB to be sent to the responder CDI driver (step 282) and subsequently detects outbound completion of that transfer (step 283). The responder CDI driver detects and allocates an IOCB for the inbound ULP command (step 284). The responder CDI driver places the IOCB for the new ULP on an event queue for detection by the responder emulation (step 286). In response, the responder emulation begins processing the new command, prepares an IOCB for the return of the requested data and issues a SEND_DATA_IN IOCTL call (step 288). The responder CDI driver reads the requested data using the SGL in the SEND_DATA_IN IOCB and causes the data to transferred to the originator CDI driver (step 290). The originator CDI driver detects the inbound transfer of data (step 291). The responder CDI driver detects outbound completion of the data transfer (step 292) and queues the SEND_DATA_IN IOCB to the event queue (step 294). The responder emulation prepares a SEND_RSP IOCB and issues a SEND_RSP IOCTL to return ending status to the originator emulation (step 296). The responder CDI driver causes the status response to be passed to the originator CDI driver (step 298), which detects and stores the inbound status (step 299), and then signals completion of the CMD_DATA_IN (received data and status) via the event queue (step 300). The originator emulation detects the completion, logically completes the I/O and frees the IOCB that had been allocated for the IOCB_CMD_DATA_IN (not shown). The responder CDI driver indicates that the outbound SEND_RSP command was completed (step 302) and signals its completion by placing the SEND_RESP IOCB on the responder event queue (step 304). The responder emulation detects the completion, logically completes the I/O and frees the IOCB that had been allocated for the IOCB_SEND_RSP IOCTL call (not shown).

Other embodiments are within the scope of the following claims.

What is claimed is:

1. A method of facilitating data storage system communication exchanges in a computer system, the method comprising:
providing a control block data structure that is common to different types of physical transport drivers and a higher-level software, each physical transport driver associated with a different data transport protocol, wherein the control block data structure is defined to isolate unique characteristics of the different types of physical transport drivers from the higher-level software so that those portions of the physical transport drivers and the higher-level software that interact with each other are generic in nature; and
using the control block data structure to pass information between the higher-level software and one of the different types of physical transport drivers, where the higher-level software and at least the one of the different types of physical transport drivers are components of firmware stored in a data storage system controller;
wherein the higher-level software comprises one of a plurality of different emulations to which the control block data structure is common;
wherein the one of the plurality of emulations comprises an emulation for a remote interface that is capable of communicating with a remote data storage system over a data link; and
wherein the control block data structure is formatted to enable the one of the different types of physical transport drivers to act as an originator during a communication exchange with the remote data storage system and a responder during a different communication exchange with the remote data storage system.

2. The method of claim 1, wherein the one of the plurality of emulations comprises a host interface emulation.

3. The method of claim 1, wherein the one of the plurality of emulations comprises a disk interface emulation.

4. The method of claim 1, wherein the control block data structure specifies an operation code and a destination address, and includes an area that is defined according to the specified operation code.

5. The method of claim 4, wherein the control block data structure further comprises fields used by the one of the different types of physical transport drivers for event notification.

6. The method of claim 4, wherein the operation code corresponds to a data transfer operation and wherein the operation code specific area includes a pointer to a scatter-gather list.

7. The method of claim 6 wherein the operation code specific area further includes a pointer to a command payload.

8. The method of claim 1, wherein the one of the different types of physical transport drivers comprises a Fibre Channel transport driver.

9. The method of claim 1, wherein the one of the different types of physical transport drivers comprises a SCSI transport driver.

10. The method of claim 1, wherein the one of the different types of physical transport drivers comprises a Gigabit Ethernet transport driver.

11. A computer program product residing on a computer readable medium for facilitating data storage system communication exchanges between physical transport drivers and higher-level software, comprising instructions for causing a computer to:
provide a control block data structure that is common to the higher-level software and different types of physical transport drivers, each physical transport driver associated with a different data transport protocol, wherein the control block data structure is defined to isolate unique characteristics of the different types of physical transport drivers from the higher-level software so that those portions of the physical transport drivers and the higher-level software that interact with each other are generic in nature; and
use the control block data structure to pass information between the higher-level software and one of the different types of physical transport drivers, the higher-level software and at least the one of the different types of physical transport drivers being components of firmware stored in a data storage system controller;
wherein the higher-level software comprises one of a plurality of different emulations to which the control block data structure is common;
wherein the one of the plurality of emulations comprises an emulation for a remote interface that is capable of communicating with a remote data storage system over a data link; and wherein the control block data structure is formatted to enable the one of the different types of physical transport drivers to act as an originator during a communication exchange with the remote data storage system and a responder during a different communication exchange with the remote data storage system.

12. A common device interface in a computer system, said common device interface comprising:

a control block data structure stored in a memory of a data storage system controller, the control block data structure being used by different types of physical transport drivers and different higher-level software emulations of firmware stored in the data storage system controller for exchanges therebetween, the emulations each corresponding to a combination of software for a different I/O control interface and software implementing an upper level protocol;

wherein the control block data structure is common to the different types of physical transport drivers and the higher-level software, each physical transport driver associated with a different data transport protocol; wherein the control block data structure is defined to isolate unique characteristics of different physical transports supported by the different types of physical transport drivers from the different higher-level software emulations so that those portions of the physical transport drivers and the higher-level software that interact with each other are generic in nature;

wherein the higher-level software comprises one of a plurality of different emulations to which the control block data structure is common;

wherein the one of the plurality of emulations comprises an emulation for a remote interface that is capable of communicating with a remote data storage system over a data link; and wherein the control block data structure is formatted to enable the one of the different types of physical transport drivers to act as an originator during a communication exchange with the remote data storage system and a responder during a different communication exchange with the remote data storage system.

13. A data storage system in a computer system, said data storage system comprising:

one or more storage devices;

a data storage system controller coupled to the one or more storage devices, and having firmware that includes different types of physical transport drivers and higher-level software, the different types of physical transport drivers and the higher-level software implemented to use a control block data structure for exchanges therebetween;

wherein the control block data structure is common to the different types of physical transport drivers and the higher-level software, each physical transport driver associated with a different data transport protocol, wherein the control block data structure is defined to isolate unique characteristics of different physical transports supported by the different types of physical transport drivers from the higher-level software so that those portions of the physical transport drivers and the higher-level software that interact with each other are generic in nature;

wherein the higher-level software comprises one of a plurality of different emulations to which the control block data structure is common;

wherein the one of the plurality of emulations comprises an emulation for a remote interface that is capable of communicating with a remote data storage system over a data link; and wherein the control block data structure is formatted to enable the one of the different types of physical transport drivers to act as an originator during a communication exchange with the remote data storage system and a responder during a different communication exchange with the remote data storage system.

* * * * *

UNITED STATES PATENT AND TRADEMARK OFFICE
CERTIFICATE OF CORRECTION

| | | |
|---|---|---|
| PATENT NO. | : 7,032,228 B1 | Page 1 of 1 |
| APPLICATION NO. | : 09/797347 | |
| DATED | : April 18, 2006 | |
| INVENTOR(S) | : McGillis et al. | |

It is certified that error appears in the above-identified patent and that said Letters Patent is hereby corrected as shown below:

Column 2, line 26, delete "FIG. 9 is table" and replace with --FIG. 9 is a table--.

Column 2, line 64, delete "commands form" and replace with --commands from--.

Column 4, line 1, delete "bus in inactive," and replace with --bus is inactive,--.

Column 5, line 54, delete "in that is gives" and replace with --in that it gives--.

Column 7, line 57, delete "that provide" and replace with --that provides--.

Column 8, line 25, delete "B", and insert --"B"),--.

Column 8, line 30, delete "CMD_DATAOUT" and replace with -- CMD_DATA_OUT--.

Column 8, line 52, delete "responder 1 emulation" and replace with --responder emulation--.

Column 9, line 20, delete "data to transferred" and replace with --data to be transferred--.

Signed and Sealed this

Eighth Day of August, 2006

JON W. DUDAS
*Director of the United States Patent and Trademark Office*